United States Patent

Mills et al.

[15] 3,693,690
[45] Sept. 26, 1972

[54] PNEUMATIC AIRCRAFT TIRE

[72] Inventors: Harold E. Mills, Wadsworth, Ohio 44281; Claude S. Young, Danville, Va. 24541

[73] Assignee: The Goodyear Tire and Rubber Company, Akron, Ohio

[22] Filed: June 29, 1970

[21] Appl. No.: 50,643

[52] U.S. Cl. .............................. 152/352, 152/361
[51] Int. Cl. .......................................... B60c 3/00
[58] Field of Search ........................... 152/352, 361

[56] References Cited

UNITED STATES PATENTS 2,498,859   2/1950   Lessig .................. 152/355
2,703,517   3/1955   Hooper .................. 97/56
3,517,720   6/1970   Brown .................. 152/352

Primary Examiner—Gerald M. Forlenza
Assistant Examiner—Robert Saifer
Attorney—F. W. Brunner and Michael L. Gill

[57] ABSTRACT

A bias belted pneumatic aircraft tire having belts of nylon cord fabric and a molded cross-sectional tread configuration wherein the center portion of the tread is depressed with respect to a pair of portions of the tread on laterally opposite sides thereof.

5 Claims, 3 Drawing Figures

*INVENTOR.*
HAROLD E. MILLS
CLAUDE S. YOUNG
BY
Michael L. Gill
ATTORNEY

PNEUMATIC AIRCRAFT TIRE

The foregoing abstract is not to be taken as limiting the invention of this application, and in order to understand the full nature and extent of the technical disclosure of this application, reference must be made to the accompanying drawing and the following detailed description.

This invention relates to pneumatic tires and more particularly to bias belted tires specifically for use on aircraft.

An aircraft tire must be capable of withstanding severe operating conditions. For example, a tire may be required to operate at speeds in excess of 200 miles per hour, absorb extreme impact forces on landing, support heavy loads, operate at more than 30 percent deflection while taxiing, withstand 45 percent deflection on take-offs, and be capable of withstanding inflation to pressures in excess of 200 p.s.i. Such extreme pressures, loads and deflections are factors which cause an increase in tread operating temperatures which in turn can lead to reduction in tire durability, particularly with respect to the tread portion.

It is, therefore, an object of this invention to provide a bias belted aircraft tire having increased resistance to heat build-up in the tread area and improved durability.

Other objects and advantages will be in part apparent and in part pointed out more in detail hereinafter. The invention accordingly consists in the features of construction, combination of elements and arrangement of parts which will be exemplified in the construction hereinafter set forth in the scope of the application of which will be indicated in the appended claims.

Figure 1:
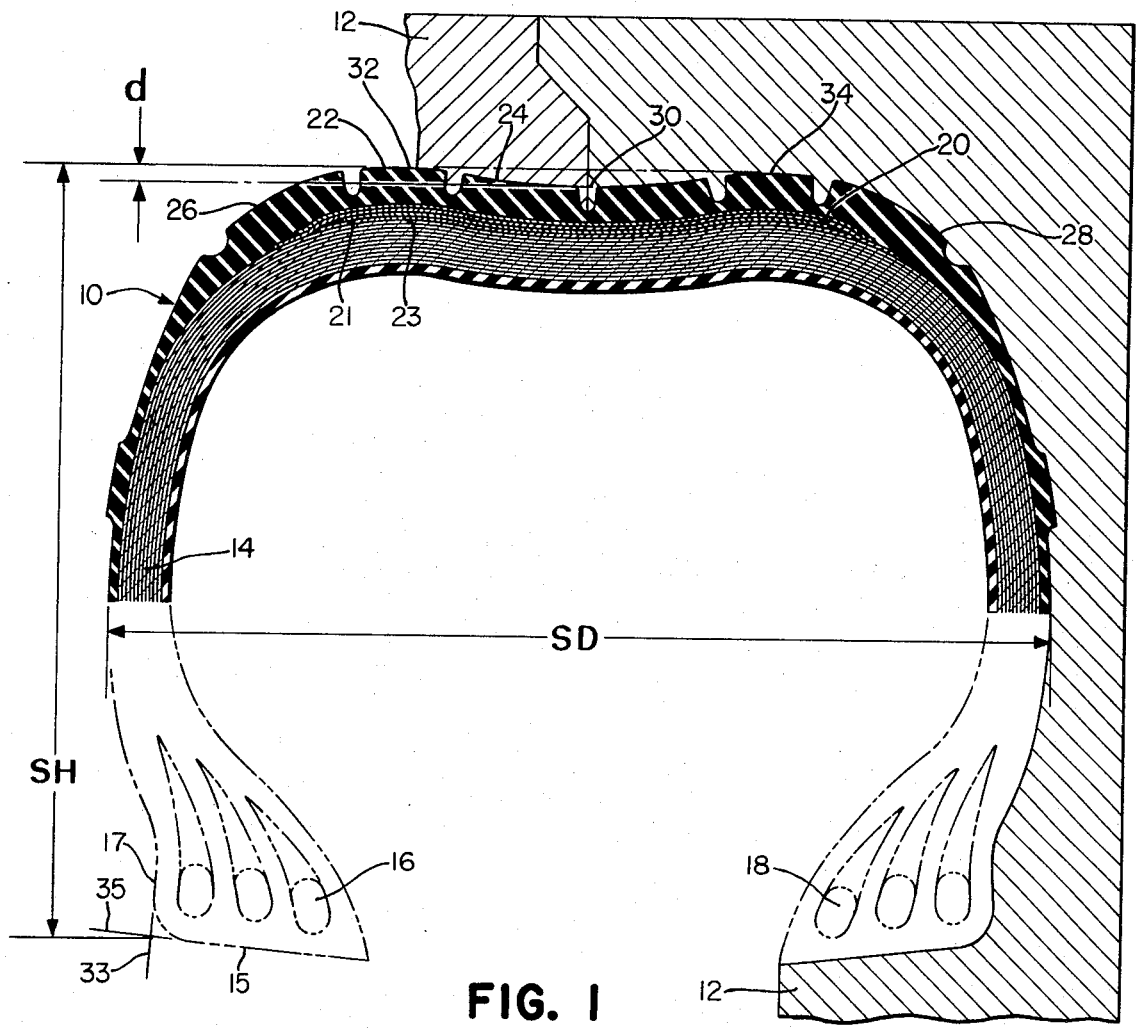
FIG. 1 is a cross-sectional view of a pneumatic tire constructed in accordance with this invention in the mold in which it was cured.

With reference to the drawing, and in particular FIG. 1, there is shown a tire 10 in a mold 12 in which it was cured. A carcass 14 extends circumferentially about the tire 10 and from bead portion 16 to bead portion 18. A plurality of superposed belt plies 20 are disposed radially outwardly of the carcass 14 and extend circumferentially about the tire. A tread portion 22 having an external ground contacting surface 24 extends circumferentially of the tire 10 and terminates at its lateral edges in shoulder portions 26 and 28.

More particularly, the specific tire 10 illustrated is a size 46 × 16 aircraft tire. The carcass 14 comprises 18 body plies of bias laid nylon tire cord fabric. However, for clarity, only 11 plies are illustrated. The cords in the carcass plies 14 form an angle of approximately 36° with respect to the mid-circumferential centerplane of the tire 10 at said centerplane and extend from bead portion 16 to bead portion 18. For purposes of this invention the "cord angle" is measured when the tire is cured and uninflated. The mid-circumferential centerplane is a plane which is perpendicular to the rotational axis of the tire and is disposed midway between the axis of the tire and is disposed midway between the bead portion 16 and bead portion 18. Each carcass ply 14 has its cords crossed with respect to the cords in its respectively adjacent carcass plies. The tire 10 is a bias ply tire in that the carcass plies have a cord angle of no greater than 75°.

Four belt plies 20 of nylon tire cord fabric are superposed on the carcass plies 14 and extend circumferentially of the tire beneath the tread portion 22. The belt plies 20 extend laterally of the tire a distance equal to at least 70 percent of the width of the ground contacting surface and in the specific embodiment illustrated terminate short of the lateral edges 26 and 28 of the ground contacting surface 24. The cords in each belt ply are continuous and form an angle of approximately 22° with respect to the mid-circumferential centerplane at the mid-circumferential centerplane. Each belt ply 20 has its cords crossed with respect to the cords in its respectively adjacent belt ply. The radially innermost belt ply 21 is located adjacent the radially outermost carcass ply 23 with no rubber therebetween other than the coat of rubber applied to the fabric during the normal calendering operation. The tire 10 is a "belted" tire in that the belt plies 20 provide circumferential restriction in the tread area. In order to provide this restriction the cord angle of the belt plies 20 should be between 5° and 30° less than the cord angle of the carcass plies 14.

In accordance with the present invention, the tire 10 is molded in a predetermined configuration wherein the center portion 30 of the tread 22 in the area of the mid-circumferential centerplane 31 is depressed a predetermined amount relative to a pair of portions 32 and 34 of the tread 22 on laterally opposite sides of the center portion 30. In the particular embodiment illustrated, the depth $d$ of the depression is equal to 0.202 inch. The depth $d$ is the radial distance between the radially innermost point of the depression and a line parallel to the rotational axis of the tire and tangent to the pair of portions 32 and 34 on laterally opposite sides of the mid-circumferential centerplane.

It has been found that an aircraft tire constructed in accordance with this invention having nylon cord belts and the molded configuration as described above, exhibits increased resistance to heat build-up in the tread area and improved durability. A possible explanation for the improved performance of a tire constructed in accordance with this invention may reside in the fact that the cords in the belt plies are considerably more elastic than the cords normally used as restrictors or belts in pneumatic tires, and the fact that the tire is molded with its outside diameter at the mid-circumferential centerplane substantially less than the inflated diameter.

Figure 2:
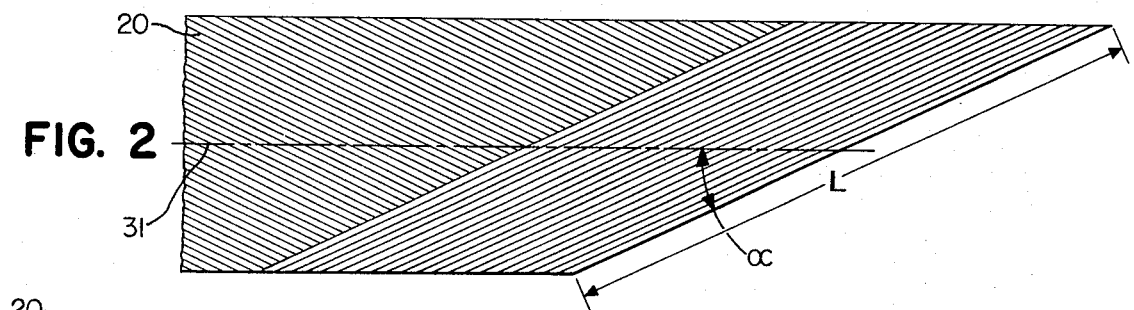
FIG. 2 is a schematic view of a pair of belts in a pneumatic tire constructed in accordance with this invention when the tire is uninflated.
Figure 3:
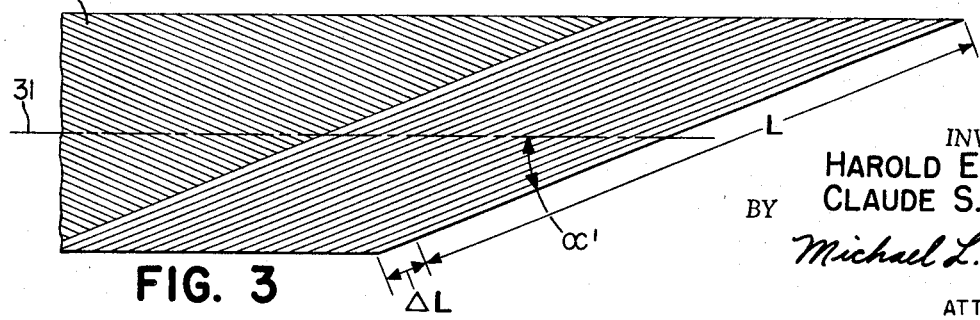
FIG. 3 is a schematic view of the pair of belts in FIG. 2 but taken when the tire is inflated.

With reference to FIG. 2, there is a schematic illustration of two of the belt plies in a tire constructed in accordance with this invention when in the configuration they are in when molded, cured, but uninflated. It will be noted that the cords in the belt ply have a predetermined angle $\alpha$ with respect to the mid-circumferential centerplane 31 and a length $L$. Upon inflation of the tire the belt will extend a certain amount and appear as illustrated in FIG. 3. It will be noted that the angle $\alpha'$ is reduced a small amount over $\alpha$ of FIG. 2 and contributes partially to the extension of the belt. This phenomenon is well known in the art as pantographing. However, since the cords in the belt of a tire constructed in accordance with this invention are in themselves substantially elastic it is believed that the cord length increases a certain amount ΔL as the tire is inflated and contribute substantially to the lengthening of the belt. In accordance with this, it appears that the belt of the tire constructed in accordance with this invention is expanded partially by pantographing and partially by extension of the individual cords.

As is well known in the art when the cords in a tire pantograph repeatedly there is a resulting repeated shear action between adjacent plies and as a result increased heat build-up. The belts, however, in a tire constructed in accordance with this invention do not pantograph as much during flexure of the tire since a good portion of the expansion and contraction of the belt during deflection of the tread as it rolls through the footprint is accomplished through extension and contraction of the elastic cords. Thus, the shear action between the belt plies is reduced with a resultant reduction in heat build-up in the tread.

In order to provide sufficient elasticity in the cords of the belts, the cords should have a modulus of elasticity in the range of 20 to 35 grams per denier. The modulus of elasticity is the slope of the initial straight portion of the stress-strain curve of the tire cord with the cord in the condition just prior to calendering. The modulus of elasticity is determined as specified in the 1969 edition of ASTM Specification, Part 24, specification number D885, Section 11.10. The tire should also be molded with its tread portion decreased relative to its normal inflated tread diameter in order that the cords be elastically extended when the tire is inflated and capable of contracting when the tire is deflected. The center portion of the tread therefore should be molded in a configuration such that the portion 30 in the area of the mid-circumferential centerline has a diameter less than the pair of portions 32 and 34 on laterally opposite sides thereof. In order to provide optimum results, the depth of the depression $d$ should be between 0.001 inch and 5 percent of the section width SD of the tire squared divided by the section height SH of the tire or in mathematical notation $d = 0.05\ SD^2/SH$. For purposes of this invention, the section width SD of the tire shall be the maximum dimension of the tire measured parallel to the rotational axis of the tire and exclusive of any lettering or adornment when the tire is in the configuration in which it is cured. The section height SH of the tire shall be the maximum radial distance of the tire from the radially outermost portion of the tread surface 24 when the tire is in the configuration in which it is cured to the intersection of a line tangent to the radially inner side 15 of the bead portion and a line tangent to the flat portion 17 of the axially outer side of the same bead portion.

While in the particular embodiment illustrated the belt plies 20 are located radially outwardly of the carcass plies 14, one or more of the belt plies 20 could be located between two or more of the carcass plies 14. Further, this invention is not intended to be limited to four belt plies and 18 carcass plies but includes tires having any suitable number of such belt plies and carcass plies.

While certain representative embodiments and details have been shown for the purpose of illustrating the invention, it will be apparent to those skilled in the art that various changes and modifications may be made therein without departing from the spirit or scope of the invention.

What is claimed is:

1. An aircraft tire having a carcass and a tread disposed circumferentially about said carcass, said carcass including bias body plies of tire cord fabric and belt plies of tire cord fabric disposed beneath the tread, said tire being characterized by the cords in said belt plies having a modulus of elasticity of between 20 and 35 grams per denier, and a radial depression in said tread at the mid-circumferential centerplane relative to a pair of portions on laterally opposite sides of said centerplane when said tire is in the configuration in which it was cured, the depth of said depression being between 0.001 inch and $0.05 \times SD^2/SH$ inch where SD equals the section width of the tire and SH equals the section height of the tire.

2. An aircraft tire having a carcass and a tread disposed circumferentially about said carcass, said carcass including bias body plies of tire cord fabric and belt plies of tire cord fabric disposed beneath the tread, the cord angle of said belt plies being between 5° and 30° less than the cord angle of said carcass plies, said tire being characterized by the cords in said belt plies having a modulus of elasticity of between 20 and 35 grams per denier and a radial depression in said tread at the mid-circumferential centerplane relative to a pair of portions on laterally opposite sides of said centerplane when said tire is in the configuration in which it was cured.

3. An aircraft tire as claimed in claim 1, wherein said tire cord fabric in said belts is nylon.

4. An aircraft tire as claimed in claim 3, wherein the cord angle of said belt plies is between 5° and 30° less than the cord angle of said carcass plies.

5. An aircraft tire as claimed in claim 2, wherein said tire cord fabric in said belt plies is nylon.

* * * * *